2 Sheets Sheet 1.

W. H. Seymour,

Harvester Rake.

No. 1005. Reissued July. 10. 1860.

Charles L. Vaughan
Augustus Fehlow } Witnesses.

William H. Seymour
By O. S. Beck
his attorney.

2 Sheets. Sheet 2.

W. H. Seymour.

Harvester Rake.

No. 1005 Reissued. July. 10. 1860.

UNITED STATES PATENT OFFICE.

WM. H. SEYMOUR, OF BROCKPORT, NEW YORK, ASSIGNOR TO HIMSELF, D. S. MORGAN, A. PALMER, AND S. G. WILLIAMS.

IMPROVEMENT IN REAPING-MACHINES.

Specification forming part of Letters Patent No. 8,212, dated July 8, 1851; Reissue No. 1,005, dated July 10, 1860.

DIVISION C.

*To all whom it may concern:*

Be it known that I, WILLIAM H. SEYMOUR, of Brockport, in the county of Monroe and State of New York, have invented new and useful Improvements in Reaping-Machines for Cutting all Kinds of Small Grain; and I do hereby declare that the following is a full and exact description of the construction and operation of the same, reference being had to the annexed drawings, making a part of this specification, in which—

Figure 1:
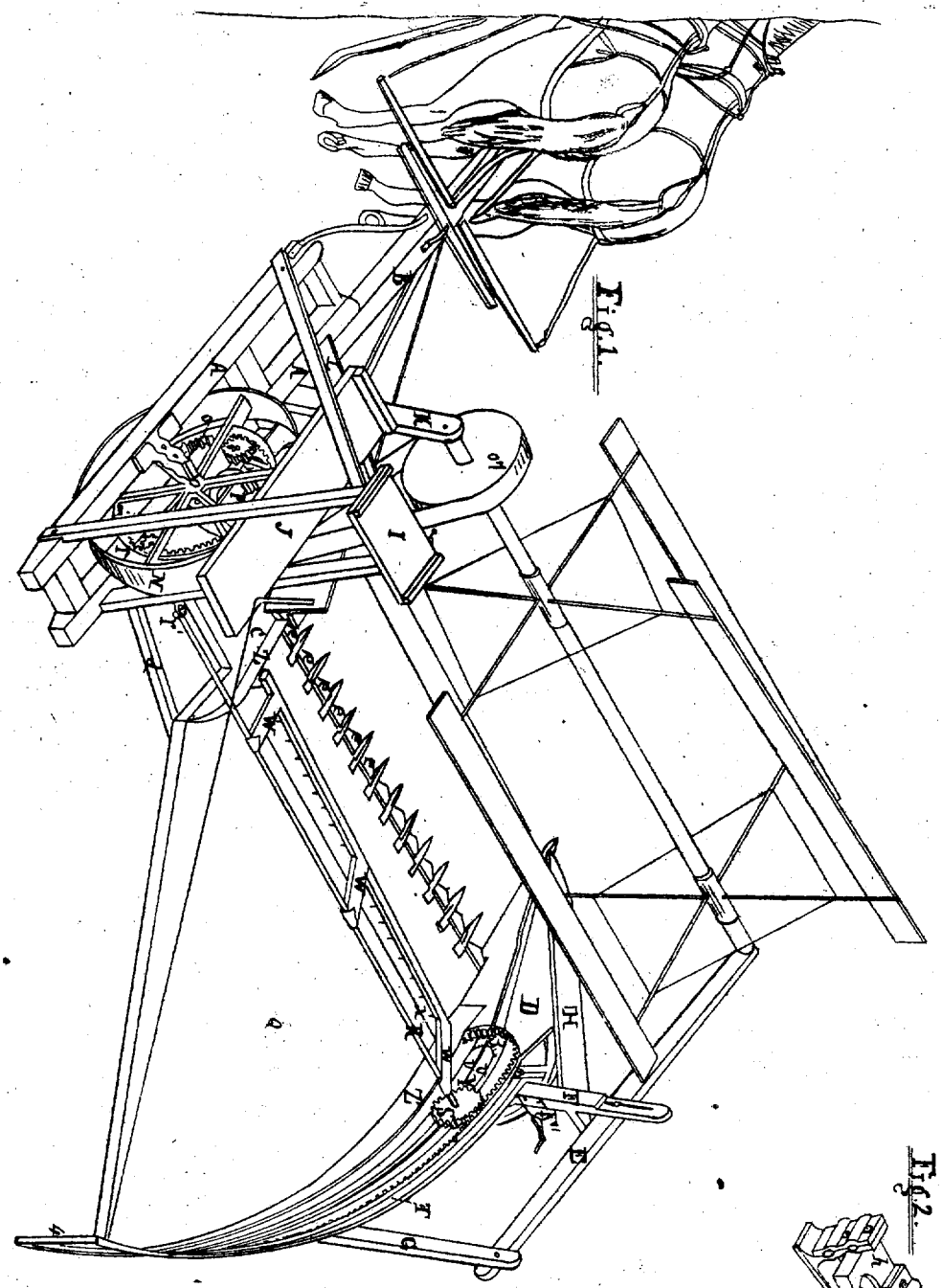
Figure 2:
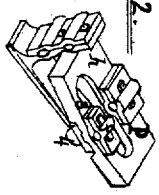
Figure 3R:
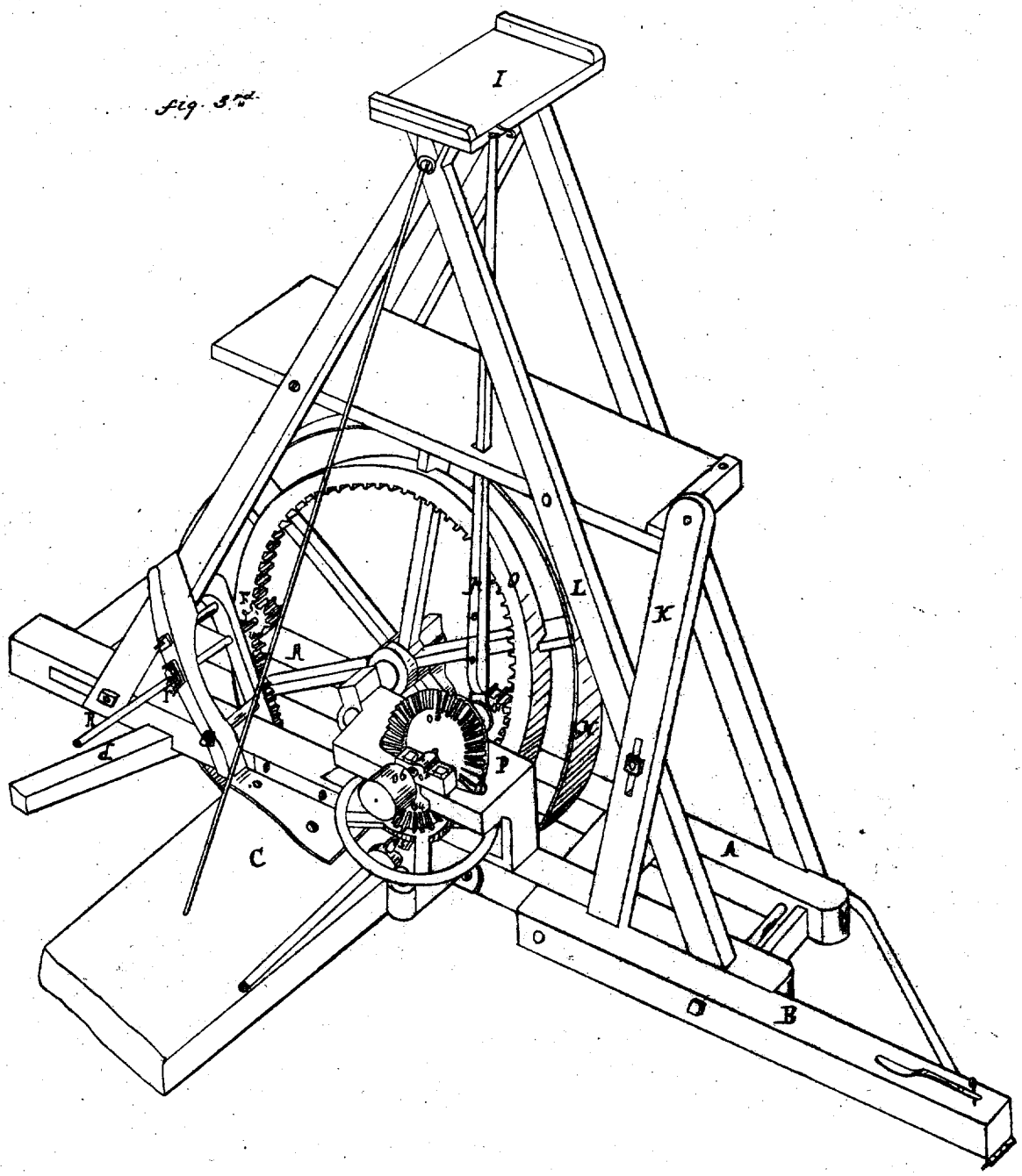

Figure 1 represents a view in perspective of a reaping-machine, to which my improvements are applied, as it would appear to a spectator in the rear and on the stubble side thereof; Fig. 3 represents a similar view of the gearing-frame as it would appear to a spectator stationed at the point of the divider and looking toward the driving-wheel; and Fig. 2 represents an isometrical view of what I term a "combination" of boxes in one casting, in which the gearing is mostly supported.

Previous to the date of my invention the discharge of the cut grain from the platform of a harvesting-machine was mainly accomplished in one of the three following ways, viz: First, by discharging it heads foremost directly in the rear of the platform; secondly, by drawing or conveying it in a rectilinear path to the stubble or gearing side of the machine and there depositing it upon the ground; and, thirdly, by conveying it to one end of the platform, upon which the grain falls when cut, in a rectilinear path, and delivering it upon a secondary platform, upon which the grain was swept around in a curvilinear path and discharged upon the ground at the side of the machine.

Some of the above operations have been effected by manual labor, some by automatic mechanism, and some by both of these means. The first of these methods is undoubtedly preferable for its simplicity and the ease with which the discharge of the grain is effected; but as the gavels fall directly into the path traversed by the team in cutting the next swath they must necessarily be removed before the return of the machine. For this reason, when the grain is too wet or too green to bind, or hands are wanting to do the work in time, it becomes important to discharge the grain at the side of the machine and far enough removed from the standing grain to leave room for the team to pass in cutting the next swath without treading on the gavels. This desideratum is attained to some extent by the second method above named, but not in a manner so practically successful as is desirable, for unless the gavel is swept from the platform by a very quick motion some of its parts are liable to touch the ground while others are still upon the platform, and as the former are at rest while the latter still partake of the forward movement of the machine the gavel is liable to be scattered; or, as the farmers term it, the grain "straggles" so much as to interfere very seriously with the labors of the binders. The third of the above-mentioned methods—viz., that of discharging the gavel in a curvilinear path at the side of the machine—I regard as superior to all others in practical efficiency; but the arrangements heretofore adopted for carrying out that object have not in my opinion been such as to accomplish the result sought to be attained in a satisfactory manner.

The invention claimed under this patent consists in arranging or placing a quadrant-shaped platform immediately behind the cutting apparatus, so as to receive the cut grain as it falls, and from which it can be swept around on an arc of a circle, and dropped upon the ground far enough from the standing grain to leave room for the team and machine to pass between the gavels and the standing grain, thereby obviating the inconvenience of taking up the grain as fast as it is cut.

The operation is hereinafter more fully described.

In the annexed drawings my improvement is represented as applied to a reaping-machine having an automatic raking mechanism.

The said improvement is also equally applicable to machines in which the several parts—such as the main frame, driving-wheel, supporting-wheels, gearing, &c.—occupy somewhat different positions relative to each other from those shown in the drawings, so long as the platform is quadrant-shaped, located immediately behind the cutting apparatus, and so arranged as to allow the grain to be discharged from the position in which it falls in the arc of a circle behind the driving-wheel, and out of the path of the horses in cutting the next swath.

In the accompanying drawings, the main or wheel frame A is constructed of two pieces of timber framed parallel to each other, and connected by three girts, one in the rear of the driving-wheel and two in front.

The tongue B, to which the team is attached, is bolted to the front end of the inner side piece of the wheel-frame.

The finger-beam or guard-piece C is attached to the inner side piece of the frame A, directly under the axle of the driving-wheel, by means of a cast-iron bracket and bolts. To the opposite end of the guard-piece C is attached the divider-piece D, which extends about three feet back of it, and two and a half feet in front of it. A brace, *d*, extends from the back end of the wheel-frame A to the back end of the divider-piece D.

The reel-bearer E is supported by the posts F and G, which extend up from the divider-piece D. The reel-bearer extends in front of the wheel-post F about three feet, and has one end of the reel-shaft hung upon its front end.

The divider-board H is made fast to the front end of the divider-piece. It is also secured to the wheel-post F about two feet above the dividing-piece.

The seat I for the operator, is constructed by four braces extending up from the wheel-frame A—one from each corner of the frame—forming two triangles parallel to each other, to the top of which the seat is attached. The foot-board J is bolted to these braces.

The reel-post K, the lower end of which is inserted into a mortise in the inner side piece of the frame A, near its front end, passes up at the side of the diagonal brace L, to which it is attached by a bolt passing through a slot in it, and also through one in the brace. This post (to the upper end of which one end of the reel-shaft is hung) is supported in this manner to admit of its being raised and lowered to vary the height of the reel.

A guard-board, M, extends from the tongue B to the guard-piece C, for the purpose of bringing the grain to the sickle. A brace of three-fourths inch round iron extends from the tongue to the guard-piece directly under the guard-board.

The driving-wheel N (three feet or more in diameter) is of cast-iron, but might be made of wood, and is hung on an axle that has its bearings (of cast-iron) bolted upon the upper side of the frame A. An internal spur cog-wheel, O, is cast upon the arms of the driving-wheel.

A pinion, $o'$, which is hung on a transverse shaft, $o^2$, that has its bearings attached to the cast frame P, in manner hereinafter described, meshes into this spur-wheel O. A bevel-wheel, $o^3$, about one foot in diameter, is hung on this shaft, and meshes into a bevel-pinion, $o^4$, hung on a vertical crank-shaft, $o^5$, that has its upper bearing in a box supported in the cast-iron frame P, and its lower bearing in a step bolted upon the inner side piece of the frame A.

The combination-box or cast frame P, Fig. 2, in which the gearing is mainly hung, has a long board base, and is bolted to the inner side piece of the frame A. Near the back end of the base is an elevation of six or eight inches, to the back part of which is bolted another piece of casting, and thus two boxes are formed (one above the other) for the inner end of the axle of the driving-wheel, which axle is shifted from one to the other of these boxes to vary the height of cut. There is another elevation at the front end of the base, corresponding in height nearly with the one at the back end, and the upper-plate part of said cast frame or combination-box extends from one of these elevations to the other, as shown at *h*, Fig. 2, and is made broader than the base or elevations, so as to project beyond them, as shown at 3, Fig. 2. Near the center of this upper plate there is a slot made, in which the bevel-wheel gear is placed, its shaft being supported at each end by bearings on this plate. The upper crank-box, 4, is bolted to the under side of this plate directly under the bevel-wheel box *f*. By this arrangement of the gearing it is more compact than it could otherwise be made, and admits of a pitman-rod of sufficient length being used without the necessity of widening the machine to make room for the pitman-rod, which would have to be done were the gearing not thus compactly arranged.

The mechanism can be thrown into or out of gear at will by means of a disconnecting-lever, *h*, which operates a sliding clutch on the driving-shaft $o^2$. The sickle *e e e* is attached to the crank by means of a rod or pitman one and a half foot long, which gives the sickle a quick vibrating motion. The crank is two inches in length and gives the sickle a stroke of four inches. There is a pulley, $o^6$, four and a half inches in diameter, on the inner end of the bevel-wheel shaft, and another pulley, $o^7$, of nineteen inches in diameter, on the reel-shaft, in range with it, over which pulleys runs a belt that gives motion to the reel.

The reel is made and operated in the usual manner.

The guard-teeth *o o o o*—eighteen in number, more or less—are six inches long, made of cast-iron, and attached to the guard-piece C by means of wood-screws in their front edges and on their tops. These guard-teeth have slots through them, through which the sickle vibrates, which slots are enlarged back of the sickles to prevent clogging.

The side of the machine opposite the driving-wheel is carried on a wheel two and a half feet in diameter, the axle of which slides vertically in guides secured upon the post F, in which guides it is raised or lowered by means of a rack and pinion, F′.

The platform Q, instead of being made in a square form and extending back of the sickle only three or four feet, as heretofore, is extended back in a circular form, as shown in the drawings, that the grain, instead of being raked off behind the machine, as heretofore, making it necessary to take up each swath as it is cut, is swept off on a circle and dropped far enough from the standing grain to be out of the way of cutting the next swath, thereby obviating the necessity for taking up each swath before another can be cut. The guards *z z'* prevent the grain from falling off the platform or from becoming entangled in the gearing.

The drawings also represent the machine as having an automatic rake; but a detailed description of said rake is deemed unnecessary here, as it is fully set forth and described in Divisions A and B of my original patent, for which Letters Patent issue simultaneously with this.

The operation of the machine is as follows: As the wheels rotate, the gearing is put in motion and the stalks are severed by the cutting apparatus and swept backward upon the platform by the reel. They are then swept around upon the platform on an arc of a circle and discharged heads foremost upon the ground at the side of the machine, behind but somewhat inside of the driving-wheel and out of the path of the horses in cutting the next swath.

What I claim under this patent as my invention is—

The arrangement of a quadrant-shaped platform immediately behind the cutting apparatus so as to receive the cut grain as it falls and from which it is discharged in the arc of a circle, substantially as described.

WM. H. SEYMOUR.

Witnesses:
CHAS. W. PALMER,
CHAS. MERIAM.